(12) United States Patent
Nichani et al.

(10) Patent No.: US 7,397,929 B2
(45) Date of Patent: *Jul. 8, 2008

(54) METHOD AND APPARATUS FOR MONITORING A PASSAGEWAY USING 3D IMAGES

(75) Inventors: Sanjay Nichani, Natick, MA (US); David Schatz, Needham, MA (US)

(73) Assignee: Cognex Technology and Investment corporation, Mt. View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/749,335

(22) Filed: Dec. 31, 2003

(65) Prior Publication Data

US 2004/0218784 A1    Nov. 4, 2004

Related U.S. Application Data

(63) Continuation-in-part of application No. 10/388,925, filed on Mar. 14, 2003.

(60) Provisional application No. 60/408,266, filed on Sep. 5, 2002.

(51) Int. Cl.
*G06K 9/00* (2006.01)
(52) U.S. Cl. .................. 382/103; 382/153; 382/154
(58) Field of Classification Search ................ 382/103, 382/154; 348/153
See application file for complete search history.

(56) References Cited

U.S. PATENT DOCUMENTS

| | | | |
|---|---|---|---|
| 3,727,034 A | 4/1973 | Pope | |
| 4,000,400 A | 12/1976 | Elder | |
| 4,303,851 A | 12/1981 | Mottier | |
| 4,799,243 A | 1/1989 | Zepke | |
| 4,847,485 A | 7/1989 | Koelsch | |
| 5,201,906 A | 4/1993 | Schwarz et al. | |
| 5,387,768 A | 2/1995 | Izard et al. | |
| 5,432,712 A * | 7/1995 | Chan | 382/191 |
| 5,519,784 A | 5/1996 | Vermeulen et al. | |
| 5,581,625 A | 12/1996 | Connell | |

(Continued)

FOREIGN PATENT DOCUMENTS

EP    0 847 030 A2    6/1998

(Continued)

OTHER PUBLICATIONS

Dhond et al.; "Structure from Stereo—A Review", IEEE TRansactions on Systems, Man, and Cybernetics, vol. 19 No. 6, Dec. 1989.*

(Continued)

*Primary Examiner*—Bhavesh M Mehta
*Assistant Examiner*—John B Strege
(74) *Attorney, Agent, or Firm*—Brian Michaelis (57) ABSTRACT

A stereo imaging based vision system is calibrated to provide heights above the ground plane for any point in the field of view. Therefore, when any object enters the field of view, it generates interest points called "features," the heights of which are measured relative to the ground plane. These points are then clustered in 3D space to provide "objects." These objects are then tracked in multiple frames to provide "trajectories." Such a system could then control alarm signals or actuate gates or motion control devices, for example, based on the various pieces of information generated about the object.

14 Claims, 5 Drawing Sheets

U.S. PATENT DOCUMENTS

| | | | |
|---|---|---|---|
| 5,866,887 A | | 2/1999 | Hashimoto et al. |
| 6,028,626 A | | 2/2000 | Aviv et al. |
| 6,081,619 A | | 6/2000 | Hashimoto et al. |
| 6,173,070 B1 | * | 1/2001 | Michael et al. ............. 382/145 |
| 6,195,102 B1 | | 2/2001 | McNeil et al. |
| 6,205,242 B1 | | 3/2001 | Onoguchi et al. |
| 6,215,898 B1 | * | 4/2001 | Woodfill et al. ............. 382/154 |
| 6,226,396 B1 | | 5/2001 | Marugame |
| 6,297,844 B1 | * | 10/2001 | Schatz et al. .................. 348/43 |
| 6,307,951 B1 | | 10/2001 | Tanigawa et al. |
| 6,345,105 B1 | | 2/2002 | Nitta et al. |
| 6,408,109 B1 | | 6/2002 | Silver |
| 6,469,734 B1 | | 10/2002 | Nichani et al. |
| 6,496,204 B1 | | 12/2002 | Nakamura |
| 6,496,220 B2 | | 12/2002 | Landert et al. |
| 6,678,394 B1 | | 1/2004 | Nichani |
| 6,701,005 B1 | * | 3/2004 | Nichani ...................... 382/154 |
| 6,756,910 B2 | | 6/2004 | Ohba et al. |
| 6,791,461 B2 | | 9/2004 | Oku et al. |
| 6,963,661 B1 | * | 11/2005 | Hattori et al. ................ 382/154 |
| 7,003,136 B1 | * | 2/2006 | Harville ...................... 382/103 |
| 7,058,204 B2 | | 6/2006 | Hildreth et al. |
| 7,088,236 B2 | | 8/2006 | Sorensen |
| 2001/0010731 A1 | | 8/2001 | Miyatake et al. |
| 2001/0030689 A1 | | 10/2001 | Spinelli |
| 2001/0048470 A1 | | 12/2001 | Lampert et al. |
| 2002/0039135 A1 | | 4/2002 | Heyden |
| 2002/0118113 A1 | | 8/2002 | Oku et al. |
| 2002/0118114 A1 | | 8/2002 | Ohba et al. |
| 2002/0135483 A1 | | 9/2002 | Merheim et al. |
| 2002/0191819 A1 | | 12/2002 | Hashimoto et al. |
| 2003/0053660 A1 | | 3/2003 | Heyden |
| 2003/0071199 A1 | | 4/2003 | Esping et al. |
| 2004/0017929 A1 | * | 1/2004 | Bramblet et al. ............ 382/103 |
| 2004/0022437 A1 | | 2/2004 | Beardsley |
| 2004/0045339 A1 | | 3/2004 | Nichani et al. |
| 2005/0074140 A1 | | 7/2005 | Grasso et al. |

FOREIGN PATENT DOCUMENTS

| | | |
|---|---|---|
| EP | 0 847 030 A3 | 12/1999 |
| EP | 0 706 062 B1 | 5/2001 |
| EP | 0 817 123 | 9/2001 |
| WO | WO-96/31047 | 10/1996 |
| WO | WO 96/38820 | 12/1996 |
| WO | WO 98/08208 | 2/1998 |
| WO | WO-01/75809 | 10/2001 |
| WO | WO-02/48971 | 6/2002 |
| WO | WO-02/095692 | 11/2002 |

OTHER PUBLICATIONS

Burschka et al.; "Scene Classification from Dense Disparity Mapis in Indoor Environments", Proceedings of ICPR 2002, Aug. 2002.*

Weng; "Agglomerative Clustering Algorithm", www.speech.sri.com, 1997.*

Jain et al.; Machine Vision, Chapter 11—Depth p. 289-297, MIT Press and McGraw-Hil Inc., 1995.*

Pollard et al.; "PMF: A Stereo correspondence algorithm using a disparity gradient limit", Perception, vol. 14, pp. 449-470, 1985.*

Prati, A. , et al., "Detecting Moving Shadows: Algorithms and Evaluations", *IEEE Transactions on Pattern Analysis and Machine Intelligence*, vol. 25, No. 7,(2003),pp. 918-923.

R. Y.Tsai, "A Versatile Camera Calibration Technique for High-Accuracy 3D Machine Vision Metrology using off-the-shelf TV Cameras and Lenses," IEEE J. Robotics and Automation, vol. 3. No. 4, pp. 323-344.

Z. Zhang, "A Flexible New Technique for Camera Calibration," Technical Report MSR-TR-98-71, Microsoft Research, Microsoft Corporation, pp. 1-22 (Mar. 25, 1999).

T. Kanade et al., "A Stereo Machine for Video-rate Dense Depth Mapping and Its New Applications," Proc. IEEE Computer Vision and Pattern Recognition (CVPR), pp. 196-202.

R.E. Kalman, "A New Approach to Linear Filtering and Prediction Problems," Transactions of the ASME, The Journal of Basic Engineering, 8: 35-45, 1960.

Gurovich Alexander, Fiksman Evgeny, "Automatic Door Control using Motion Recognition", Technion, Israel Institute of Technology, Aug. 1999.

Jeffery S. Norris, "Face Detection and Recognition in Office Environments", Department of Electrical Engineering and Computer Science, Massachusetts Institute of Technology, (May 21, 1999).

Dhond, U. R. Structure from Stereo—A Review. IEEE Transactions on Systems, Man, and Cybernetics, 19(6): 1490-92, 1500-03, 1989.

Pollard, S. B. PMF: A Stereo Correspondence Algorithm Using a Disparity Gradient Limit. Perception, 14: 453-455, 1985.

Admitted Prior Art—Specification of Application, p. 9, lines 21-25.

Burschka, D. Scene Classification from Dense Disparity Maps in Indoor Environments. Proceedings of ICPR 2002, sections 3-3.1.3, 2002.

Weng, F. Agglomerative Clustering Algorithm. http://www.speech.sri.com/ p. 1, 1997.

Jain, R. Machine Vision. MIT Press and McGraw-Hill Inc., Chapter 11, 289-297, 1995.

Gluckman, Joshua et al., "Planar Catadioptric Stereo: Geometry and Calibration", IEEE, (1999).

* cited by examiner

METHOD AND APPARATUS FOR MONITORING A PASSAGEWAY USING 3D IMAGES

CROSS REFERENCE TO RELATED APPLICATIONS

The present application is a continuation in part of U.S. application Ser. No. 10/388,925 filed Mar. 14, 2003 which claims benefit of Provisional Application 60/408,266 filed Sep. 5, 2002.

FIELD OF THE INVENTION

The present invention relates to machine vision systems and more particularly to a method and apparatus using machine vision to detect objects moving in a particular direction in an area and cause an automated response thereto.

BACKGROUND OF THE INVENTION

The movement of people or objects through various spaces and passageways must be monitored or controlled for any number of purposes including safety and security purposes. Such monitoring and control are performed most efficiently when it is done automatically by machine with little or no human interventions.

Various sensors are known for use in automatic object detection systems. For example, photo voltaic sensors detect objects interrupting a beam of visible or UV light; mechanical switches and load cells detect objects through direct or indirect contact or by detecting an object weight; thermal sensors detect objects radiating heat; and electromagnetic sensors detect objects such as metal objects that alter electromagnetic fields. These sensors typically send signals to logic circuits which control mechanical actuators, record the object's presence and/or alert an operator based on the presence or absence of an object.

Such sensors are not well suited for certain security systems because they are easily circumvented; they only detect a certain class of objects moving through a narrowly constrained space; and they can not directly determine an object direction or velocity. These sensors often have problems maintaining uniform sensitivity throughout a monitored space or over time and can be prohibitively expensive.

Various camera based systems are also known for use in object detection systems and control systems in security or safety applications. Camera based systems have the additional advantage of providing an image of the monitored space which can be stored for later analysis. Such systems typically use an electronic still camera or an electronic video camera which capture images on an array of charge coupled devices (CCDs) and converts the images into electronic data files for automatic analysis or storage. For example, automatic face recognition systems have long been the subject of experimentation and are now in use in several high security applications. These systems can be too slow, expensive or unreliable for most common applications.

Motion detection systems have been developed using electronic video cameras and frame capturing processes which detect and track certain features in each frame a captured video sequence. For example, automatic door control systems are known that track corners of an object from frame to frame and calculate a velocity vector for the object. The velocity vector is used to determine whether to open or close an automatic door.

Heretofore known feature tracking systems, like the corner tracking system described above, extract data from a monocular image sequence. Such monocular systems provide only 2 dimensional (2-D) from which to compute velocity vectors. Such monocular systems have difficulty distinguishing shadows and lighting effects from actual 3-dimensional objects. This problem is exacerbated in certain security systems wherein, for example, a pre-alarm condition triggers a warning strobe light that affects detected images of the monitored space.

Monocular video monitoring systems operating on 2-D image data must tolerate or blind spots or blind intervals during which regular obstructions appear in the camera's filed of view. For example, some doors or doorframes being controlled by monocular video systems can come into the field of view of the monitoring cameras whenever they are opened. Some systems are programmed to ignore frames or frame segments whenever the door is opened. Other more refined systems use additional sensors to detect a door's actual position over time and ignore only the portions of a frame where the door or door frame is expected to appear. See for example U.S. Patent Application No. US 2001/0030689 to Spinelli.

When monocular vision motion detection systems are first installed they must be "trained" using a reference image in order to establish a frame of reference appropriate to the particular environment. Such training can often involve tedious and expensive procedures. Images coordinates are calculated, stored or output in 2-D image space because real 3-D coordinates are unavailable in monocular systems.

SUMMARY OF THE INVENTION

Embodiments of the present invention use a factory calibrated stereo system that provides 3D coordinates of points in the field of view. At installation time the plane of the ground is calibrated relative to the camera. Only those points are considered interesting that which have some height relative to the ground plane. Therefore, any shadows and highlights can be filtered out due to lack of height relative to the ground plane. The interest points are then clustered either directly in 3D space or their projections are clustered on the ground plane in a 2D space. Each separate cluster is considered an object and is tracked from frame to frame. Therefore, at each frame the following information is available: the number of objects, their positions in 3D space (centroid), and the instantaneous motion vector (magnitude and direction). Using this raw data, events can be generated when an object is exiting normally or if it enters the wrong way. For example, a pre-alarm could be issued if the object is not far into an exit lane and does not have a large velocity. Otherwise an alarm condition can be issued.

An illustrative embodiment of the present invention monitors an exit lane or an area for security and ensures that traffic flows only in the normal direction through it (i.e., the exit direction). Any object that flows in the opposite direction will be considered an intruder or a threat and will be flagged as a pre-alarm or alarm condition.

Since the present invention comprises a camera based system, it is possible to record images (useful in the event of an intrusion) and also collect traffic flow statistics using various embodiments of the invention. A frame-to-frame motion algorithm according to various embodiments of the present invention could also be more generally applicable in any number of applications without departing from the spirit and scope of the present invention.

Other features and advantages of the various embodiments of the present invention with respect to heretofore known camera based motion detection and control systems include superior shadow discrimination and background invariance. Due to the 3D nature of stereo systems it is easier to discriminate between shadows and an actual object. The shadows lie on the ground plane (zero height) as opposed to an actual object. SDS will work with any background, structured or unstructured. This is particularly important due the variety of surfaces present under a door i.e. carpet, concrete, mats etc. Further the appearance of these surfaces change with the passage of time. Problems caused by shadows and highlights in the prior are thus eliminated in the various embodiments of the present invention because detection of an object's motion in the present invention is based on physical coordinates rather than on appearance of background.

The present invention also features easy installation and set up without requiring initial training procedures. SDS involves only a one-time installation setup and requires no further training of any sort. This feature provides a distinct advantage relative to monocular motion based systems which usually require a reference image to compare with captured images. Another advantage of the present invention is that stationary or slow-moving objects do not become invisible as they would to a motion detection system.

The present invention also features trajectory based triggering whereby SDS is able to segment objects in 3D space and track them using a custom algorithm, such as Patquick available from Cognex Corp. of Natick, Mass., which is far superior to tracking their projections in 2D image space using standard block matching methods.

The present invention also features calibrated 3D system whereby SDS is calibrated in real world units. The invention is thereby it is able to accept setup parameters and triggers based on real world heights and distances.

The present invention also features optional storage of stereoscopic images for a predefined time interval. This option can provides video evidence in presence of a mishap or can be used to reconstruct a full 3D scene over an extended period. Such extended data can provide a more objective base for analysis.

The present invention also features a flexible masking capability. The masking capability allows a user during set up to graphically specify either in 2D or in 3D zones to be masked out. This feature can be used, for example, to account for either non-custom doorways or stationary background scenery in the field of view.

The present invention also features elimination of excessive blind spots.—A non-stationary background like the door opening motion itself (into the outbound area) can be effectively masked out by first detecting the doorframe and then simply ignoring points that lie on that plane. Such a system is always operational and does not have any blind intervals.

Accordingly, the present invention is easier to use and more robust than heretofore known motion detection and control systems.

BRIEF DESCRIPTION OF THE DRAWINGS

The foregoing and other features and advantages of the present invention will be more fully understood from the following detailed description of illustrative embodiments taken in conjunction with the accompanying drawings in which.

DETAILED DESCRIPTION

Figure 1:
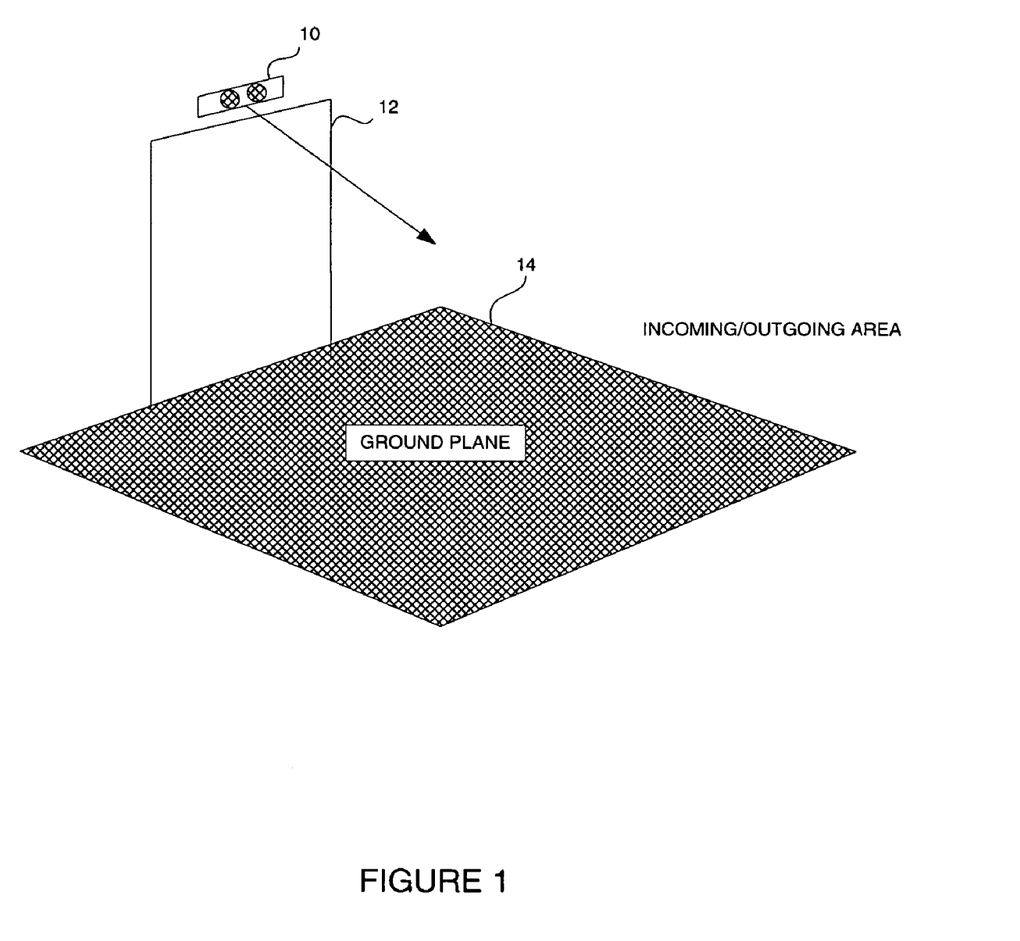
FIG. 1 is a schematic diagram of a stereo door sensor layout according to an illustrative embodiment of the present invention.

The layout of an illustrative embodiment of the present invention is described with the reference to FIG. 1. The illustrative embodiment includes a set of stereo cameras 10 mounted above a passageway 12 looking downward and outward towards the incoming area 14. Optionally, another set of cameras (not shown) can be mounted on the other side of the passageway looking at the outgoing area. The invention is calibrated to provide heights above the ground plane for any point in the field of view. Therefore, when any object enters the field of view, it generates interest points called "features," the heights of which are measured relative to the ground plane. These points are then clustered in 3D space to provide "objects." These objects are then tracked in multiple frames to provide "trajectories." Such a system could then trigger an event such as an alarm or open or close a gate, for example, based on the various pieces of information generated about the object.

In the illustrative embodiment, the following geometry for the placement of cameras is used. Two (or three) stereo cameras 10 view the incoming area 14 and optionally another two (or three) stereo cameras (not shown) view the outgoing area. The two sets of cameras are mounted above and on either side of the passageway 12 and are looking downward and outwards from the passageway. FIG. 1 shows the geometry for only the incoming area. The geometry for the outgoing area in the illustrative embodiment is reflected and symmetric about the passageway (though it need not be).

In an exemplary system, the baseline distance between the optical centers of the cameras is 12 mms and the lenses have a focal length of 4 mm (70 degree Horizontal Field of View (HFOV)). The cameras are mounted approximately about 2.2 meters from the ground and have a viewing area that is approximately 2.5 by 2.5 meters. The surface normal to the plane of the cameras points downward and outward as shown in FIG. 1 wherein the cameras are angled just enough to view the bottom of the passageway. Camera angles in the exemplary system provide some overlap between the fields of view of the incoming camera set and the outgoing camera at the bottom of the passageway.

Figure 2:
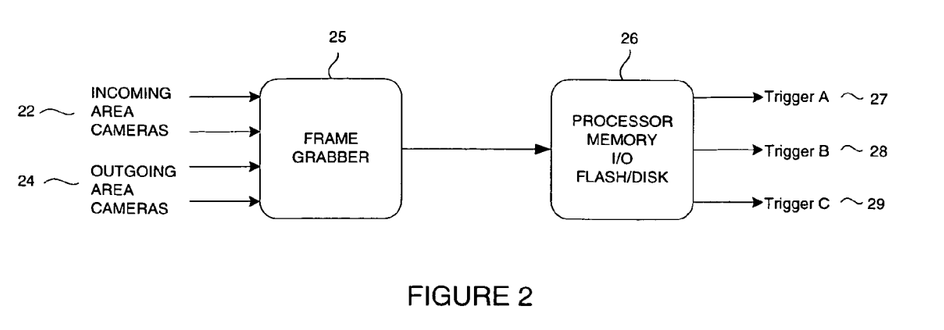
FIGS. 2 and 3 are schematic block diagrams of alternative configurations of system components illustrative embodiments of the present invention.

At least two possible system configurations can be used to implement the present invention. In a first illustrative system configuration as shown in FIG. 2, the systems monitoring the incoming area and outgoing area are tightly integrated. A frame grabber 20 receives input from both incoming area cameras 22 and outgoing area cameras 24 and processed on a processing system 26. The processing system outputs an appropriate control signal 27, 28, 29.

Figure 3:
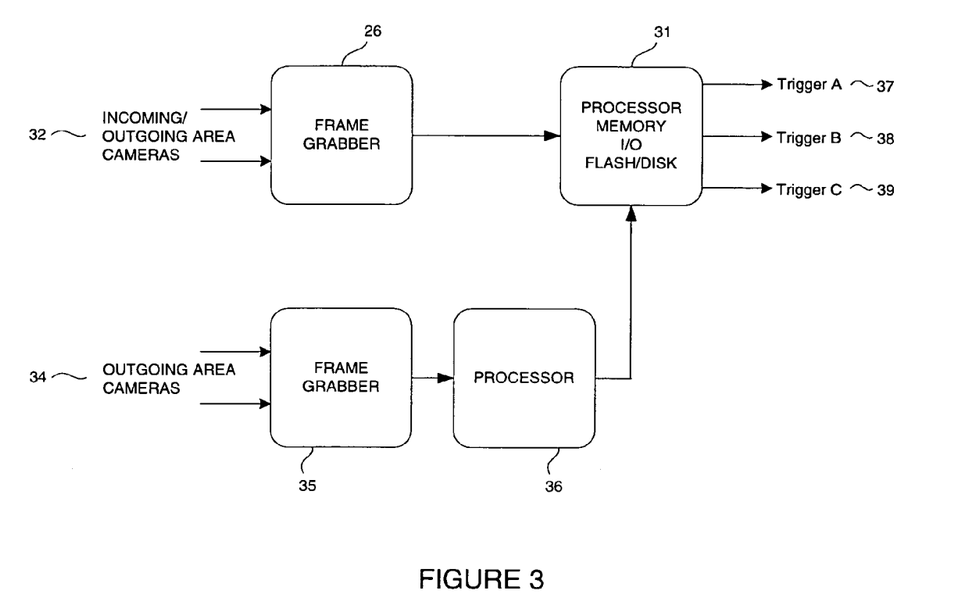

In a second illustrative system configuration as shown in FIG. 3, independent systems monitor incoming and outgoing areas separately. A separate frame grabber 30, 35 receives input from either an incoming 32 or outgoing camera set 34. A separate processor 31, 36 processes the respective outputs from each frame grabber 30, 35. In this configuration, the monitoring of the outgoing area is optional. If monitoring of both the incoming area and outgoing area is performed, one sub-system is designated as a master and the other as a slave. The outputs of the slave sub-system, here shown as the outgoing camera system, are then input to the master sub-system allowing the master sub-system to make a final decision as to whether to trigger an event.

In the illustrative embodiment of the present invention various parameters are set up in the factory. The factory setup involves calibration and the computation of the intrinsic parameters for the cameras and the relative orientation between the cameras. Calibration involves the solution of several sub-problems each of which has several solutions that are well understood by persons having ordinary skill in the art. Further, rectification coefficients must be computed to enable run time image correction.

Stereo measurements could be made in a coordinate system that is different from the coordinate systems of either camera. For example, the scene or world coordinates correspond to the points in a viewed scene. Camera coordinates (left and right) correspond to the viewer-centered representation of scene points. Undistorted image coordinates correspond to scene points projected onto the image plane. Distorted image coordinates correspond to points having undergone lens distortion. Pixel coordinates correspond to the grid of image samples in the image array.

In the illustrative embodiment one camera is designated to be a "reference camera," to which the stereo coordinate system is tied to. An interior orientation process is performed to determine the internal geometry of a camera. These parameters, also called the intrinsic parameters, include the following: effective focal length, also called the camera constant; location of the principal point, also called the image center; radial distortion coefficients; and horizontal scale factor, also called the aspect ratio. The cameras used in the illustrative embodiment have fixed-focus lenses that cannot be modified; therefore these parameters can be computed and preset at the factory.

A relative orientation process is also performed to determine the relative position and orientation between two cameras from projections of calibration points in the scene. Again, the cameras are mechanically fixtured such that they stay in alignment and hence these parameters can also be preset at the factory.

A rectification processes, closely associated with the relative orientation, is also performed. Rectification is the process of resampling stereo images so that epipolar lines correspond to image rows. "An epipolar line on one stereo image corresponds to a given point in another stereo image is the perspective projection on the first stereo image of the three-dimensional ray that is the inverse perspective projection of the given point from the other stereo image." Robert M. Haralick & Linda G. Shapiro, *Computer and Robot Vision Vol. II* 598 (1993). If the left and right images are coplanar and the horizontal axes is collinear (no rotation about the optical axis), then the image rows are epipolar lines and stereo correspondences can be found along corresponding rows. These images, referred to as normal image pairs provide computational advantages because the rectification of normal image pairs need only be performed one time.

The method for rectifying the images is independent of the representation used for the given pose of the two cameras. It relies on the principal that any perspective projection is a projective projection. Image planes corresponding to the two cameras are replaced by image planes with the desired geometry (normal image pair) while keeping the geometry of the rays spanned by the points and the projection centers in tact. This results in a planar projective transformation. These coefficients can also be computed at the factory.

Given the parameters computed in interior orientation, relative orientation and rectification, the camera images can be corrected for distortion and misalignment either in software or hardware. The resulting corrected images have the geometry of a normal image pair i.e., square pixels, aligned optical planes, aligned axes (rows), and pinhole camera model.

An exterior orientation process is also performed during factory set up of the illustrative embodiment. The exterior orientation process is needed because 3D points in a viewed scene are only known relative to the camera coordinate system. Exterior orientation determines the position and orientation of a camera in an absolute coordinate system. An absolute 3D coordinate system is established such that the XY plane corresponds to the ground plane and the origin is chosen to be an arbitrary point on the plane.

Ground plane calibration is performed at the location of the installation. Calibration targets are laid out in the floor to compute the relationship between the stereo coordinate system attached to the reference camera and the world or scene coordinates system attached to the ground plane.

Regions of interest are also set up manually at the location of the installation. This involves capturing the image from the reference camera (camera that the stereo coordinate system is tied to), rectifying it, displaying it and then using a graphics overlay tool to specify the zones to be monitored. Multiple zones can be pre-selected to allow for different run-time algorithms to run in each of the zones. The multiple zones typically include particular 3D spaces of interest. Filtering is performed to eliminate features outside of the zones being monitored. In alternative embodiments of the invention, automatic setup is can be performed by laying out fiducial markings or tape on the floor.

While there are several methods to perform stereo vision according to the present invention, one such method is outlined below with reference to FIG. 6. The stereo block 70 takes a set of input images 72A, 72B, 72C (Right, Left, Top) and produces the 3D location of the edge or boundary points in the reference image. Inputs from three cameras are shown, although two cameras will suffice in most cases, especially if the features predominantly occur in one orientation. For example, if the features are vertical, then horizontally placed right and left cameras will be able to provide good 3D information, such as in the case of the door sensor application.

During an edge processing step 75A, 75B, 75C a stereo algorithm uses a feature detection scheme which includes parabolic smoothing, non-integral sub-sampling (at a specific granularity), sobel edge detection followed by true peak detection and finally chaining. This feature detection scheme is known in the art and available in the Patmax products by Cognex Corporation, of Natick Mass. The edge processing step 75A, 75B, 75C results in a list of connected edgelets (chains). Only features that belong to long enough chains are passed on to the next stage. For example, only chains exceeding a predetermined length are identified as features to be passed along. In FIG. 6, features with x, y location and their gradient magnitude (m) and angle (a) for the three cameras r, l, t are passed to the matcher.

A matching process (also called a correspondence procedure) 73A, 73B is used to match features from the right image 72A to the left image 72B (horizontal disparities) and also the right image 72A to the top image (vertical disparities) 72C. The initial set of possible matches for each feature is constrained using the epipolar constraint. A match between a feature in two images is then characterized by an initial strength of match (SOM), by comparing the strength and orientation of the edgelets.

Next, smoothness constraint is enforced by limiting the allowable disparity gradient; this provides a suitable balance between disambiguating power and the ability to deal with wide range of surfaces. This step involves updating the SOM of each correspondence by looking at correspondences of the neighbors of the features under consideration. Next an iterative winner-take-all procedure that enforces the uniqueness takes over. The method works as follows: At each iteration those matches for which the matching strength is maximum for both of the features forming them is chosen as correct. Then, because of the uniqueness constraint, all other associated matches with these two features are eliminated from further consideration. This allows further matches to be selected as correct provided that they now have the highest strength for both constituent tokens. The matcher 73A, 73B outputs the x and y locations of feature points in the reference image (xr, yr) and the disparities in horizontal and vertical directions (dri, drt). The angles of features are also output (ar) to facilitate merging.

The horizontal and the vertical disparities are then merged 74 to produce a consolidated output. In the illustrative embodiment, a very simple multiplexing scheme is used. If the orientation of the feature is between 45 and 135 or between 225 and 315, the horizontal disparities are used otherwise the vertical disparities are used. Note that if only two cameras are used then there is no need to perform a merging step 74. The output of the merger 74 is a plurality of feature points with disparities (xr, yr, d) 76.

Once the locations and disparities 76 of feature points are computed and camera geometry 78 is known (due to calibration) it is trivial to compute 77 the X, Y and Z location 79 of the points in either the stereo camera or scene coordinate systems.

An optional step of segmentation 71 (also called clustering) can be performed. The segmentation step 71 returns distinct 3D objects in the scene wherein each object contains a mutually exclusive subset of the 3D boundary points output by the stereo algorithm.

Matching methods can be classified as feature based (as the one described above with respect to FIG. 6) and area based methods. Feature based techniques are more view-point tolerant but produce sparse results. Area correlation (matching) techniques produce dense results and are less view-point tolerant. The area correlation techniques have extremely regular algorithmic structure, therefore are more easily optimized. Examples of commonly known correlation measure used by $3^{rd}$ party systems include the SAD (Sum of Absolute differences) of the LOG (Laplacian of Gaussian) transformed image.

The dense disparity image can be processed using standard image processing techniques like histograms, blob connectivity to determine if there is significant height above the ground plane. However, these provide only crude estimates. Therefore, it is desirable to convert the dense disparity map into a sparse point cloud. This can be achieved by considering only those disparity pixels in the dense map that are "valid." FIG. 7 outlines a method to produce sparse disparities using a $3^{rd}$ party system.

Like the method described hereinbefore with respect to FIG. 6 the alternative method described with reference to FIG. 7 focuses on the boundary points or edges (due to occlusion and reflectance) because the information is most reliable only at these points. The right and left images 80B, 80A are rectified 81B, 81A and passed to a matcher 84 which produces a dense disparity map (image) 83. The reference image is further evaluated by an edge processor 82 as described hereinbefore with respect to FIG. 6. The output of the edge processor 82 are xr, yr locations of features which are then mapped into the disparity image 83 to evaluate disparities at these points. This is called sparsification 85. The output of the sparsification process 85 is a plurality of feature points with disparities (xr, yr, d) which are easily converted to 3D X, Y, Z, coordinates 87 using the camera geometry 88 that is known from pre-calibration.

Figure 6:
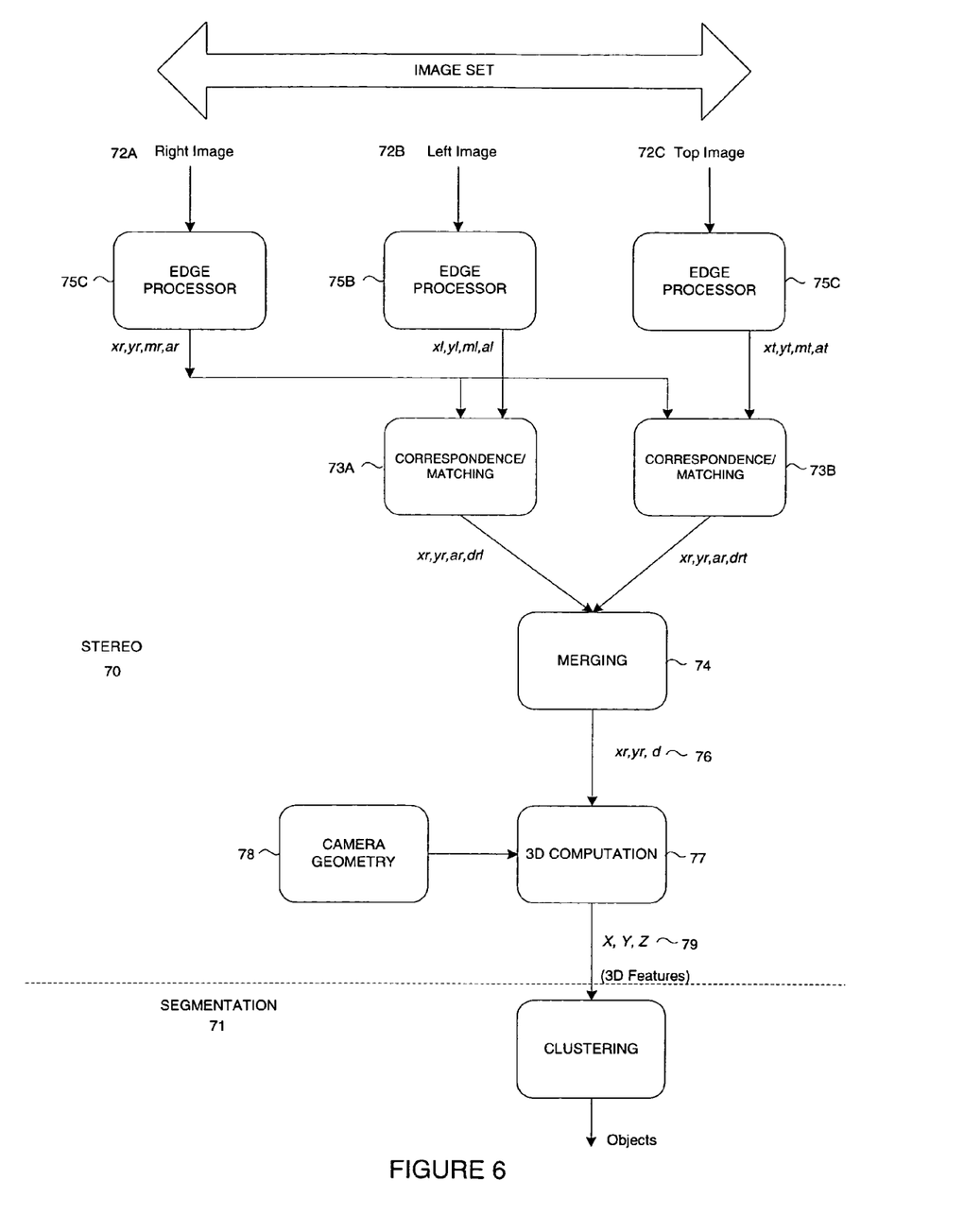
FIGS. 6 and 7 are process flow diagrams showing the steps of stereo matching processes according to alternative illustrative embodiments of the present invention.
Figure 7:
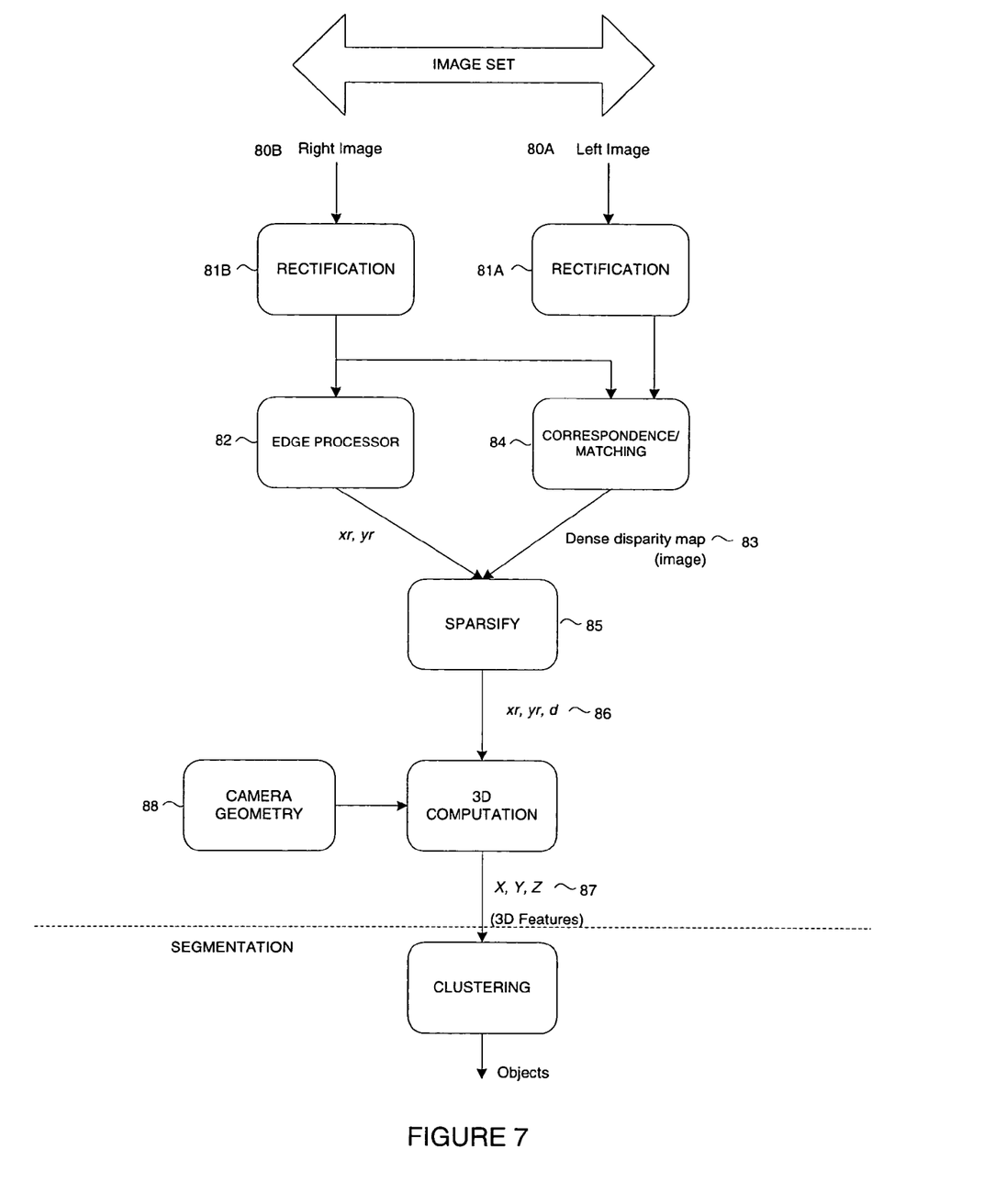

The stereo matching steps according to FIGS. 6 and 7 generate feature points (edges or boundary points) with 3D information at these points. Further processing of the 3D points is described with reference to FIG. 4.

The 3D points are transformed from a camera-centric coordinate system to a world coordinate system, which is attached to the ground plane in a stereo/clustering step (such as the steps described hereinbefore with respect to FIGS. 6 and 7). Optionally the 3D points are then clustered whereby once the 3D points at the features in the image are extracted they are segmented into mutually exclusive subsets. Each subset corresponds to a distinct object in the scene.

Standard clustering techniques can be used to form clusters of the 3D points. The technique that is effective is the agglomerative hierarchical clustering. Initial clusters are first achieved by using the chain organization of the edgelets. The chains of features are broken into contiguous segments based on abrupt changes in z between successive points (the theory being if they are contiguous in image coordinates and have similar z values then they correspond to the same object and hence the same cluster). Each of these segments now corresponds to a potentially separate cluster. Next the two closest clusters are merged based on a "minimum distance" criteria. This is akin to a greedy minimum spanning tree algorithm. The algorithm iterates until the desired number of clusters are obtained or the "minimum distance" is greater than a certain threshold.

The above technique clusters in 3D however; the technique outlined below reduces the problem to a 2D problem by using constraints. The constraint that is used places the objects in a plane in 3D space. This is not a very disadvantageous restriction in a typical application. The criteria for segmentation into distinct objects is that the minimum distance between the objects along a particular plane (2D distance) exceed a preset spacing threshold. Therefore it is implicit that the projections of the objects in the plane do not overlap. This again is not very disadvantageous because the objects lie on the plane and the surfaces of the object are generally normal to the plane.

Figure 4:
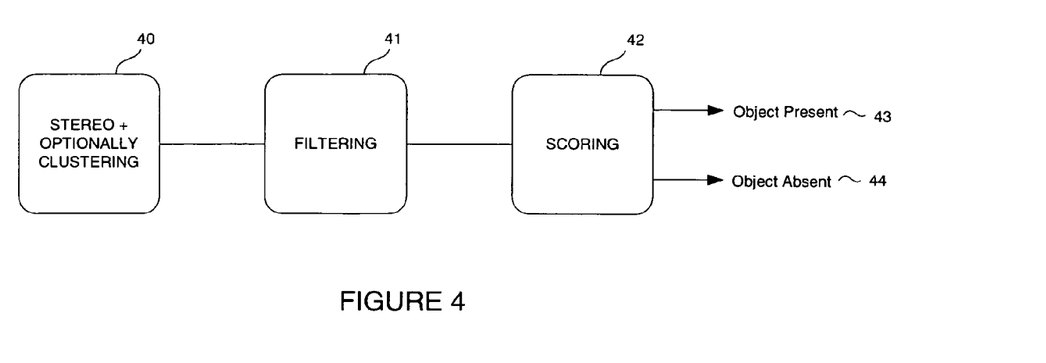
FIGS. 4 and 5 are process flow diagrams showing the steps of alternative illustrative embodiments of the present invention.

Next a filtering step 41 is performed wherein all the points that are on or close to the ground are filtered out. Any points masked out by the regions of interest that were setup during installation are ignored. Since a 3D coordinate system is first attached to the ground plane, it is assumed that the surface normal of this plane is the z-axis. This allows the selection of an arbitrary origin, x-axis, and y-axis. Since objects were constrained to lie in a known (x, y) plane, objects are segmented according to how they are separated in this plane (considering the 2D distance along the xy plane).

In the illustrative embodiment, all 3D points are first converted to the ground plane coordinate system. Next points that are too distant or close (range), too far left or right (lateral distance), too high (height of the object) or too close to the x-y plane are eliminated. Eliminating points close to the ground plane helps remove shadow and plane surface features. The remaining points that do not get filtered out are then projected into the ground plane. This can then be converted to a 2D image and standard 2D labeling/blob connectivity is used to obtain distinct regions (Collection of pixels), where each pixel represents a plurality of feature points.

A scoring step 42 is then performed wherein the resulting points are then scored using a scoring function. The score is accumulated and compared against a predetermined threshold to determine if an object is present 43 or absent 44. In the illustrative embodiment, the score is accumulated independently for each cluster. The threshold then is applied to each cluster as opposed to all the points that are generated. This can be more robust especially if the scene produces a lot of isolated false matches but at the expense of more computational power.

Figure 5:
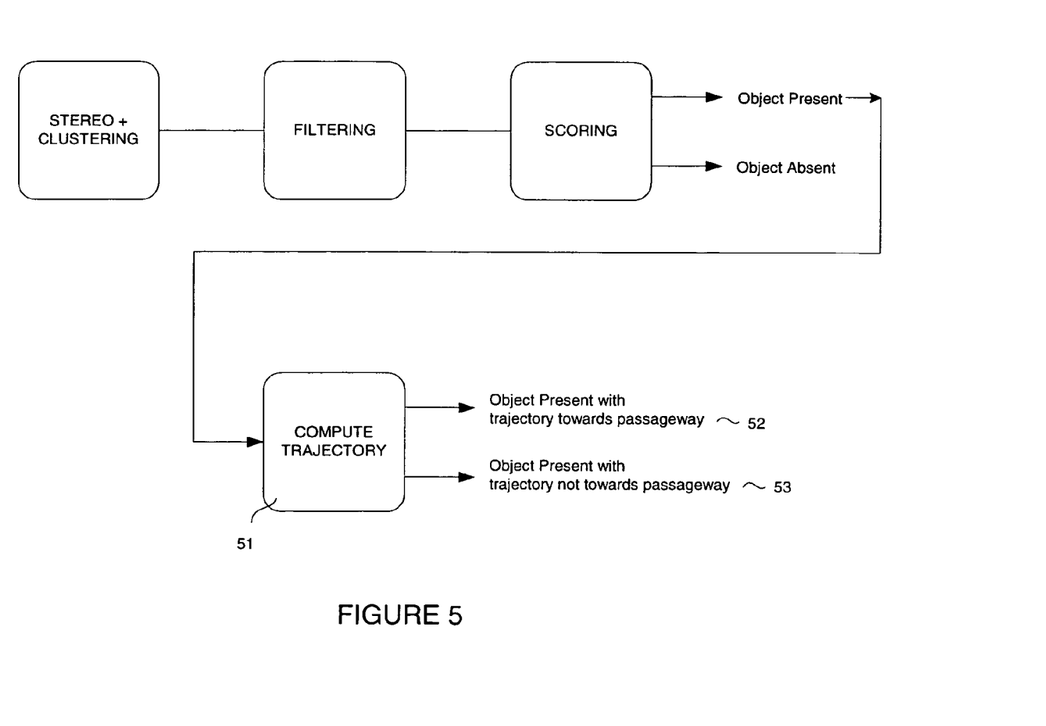

An alternative algorithm is described with reference to FIG. 5 wherein the first part of the algorithm is similar to the algorithm of FIG. 4 except that the clustering is no longer optional but mandatory. Once an object (cluster) has been detected, a trajectory computation step is performed wherein the motion vector of the cluster is computed to further qualify the result as to whether the object is headed towards the door 52 or not 53.

Motion estimation is performed by estimating the 2D motion field or the optical flow (apparent motion) in a set of frames in an image sequence. A large number of motion estimation techniques are known in the art. Motion estimation shares some similarities with disparity estimation such as feature and correlation matching for stereo vision systems.

Other differential techniques such as optical flow methods can be used in applications having short time intervals between frames. However, in the illustrative embodiment of door sensor application, no assumption is made that the time interval between frames is small. Therefore optical flow techniques are not used in the illustrative embodiment.

One known motion estimation method involves tracking whereby elements are followed through time using frame-by-frame motion estimates or by implicitly deriving such estimates. Block-matching schemes (used extensively in motion compensation and video compression) or area correlation schemes (as used in stereo matching) can be used to estimate motion between frames.

The illustrative embodiment uses a unique algorithm, however combining feature based correlation and area based correlation. Points that belong to an object are already segmented in a given frame. Therefore, they can be determined in the subsequent frame by correlating these features in an area around the expected object position in the following frame. At time t−1, each object feature point contains a weight, an x and y location and a direction. At time t the rectified reference image is considered to be the "run time image." This image is run through an edge processor similar to the one described hereinbefore, to produce gradient magnitude and angle images. During the Coarse correlation step the train probes are correlated with the angle image, the correlation measure being used is the sum of absolute differences. During the fine correlation step, the magnitude image is used to produce a sharper correlation peak.

This technique has advantages over standard area correlation techniques. For example, in standard techniques the block or area that is being correlated has different motion vectors. This produces poor correlation values and, in some cases, an erroneous correlation vector. The algorithm, according to the illustrative embodiment takes advantage of the fact that the object being tracked is already segmented. The illustrative algorithm therefore focus only on those feature points and try to find them in the subsequent frame(s).

Once a motion vector is computed from frames t to t-1 for a given object, correspondence is known between the various object points. Since the 3D locations of these points are known, 3D motion can be optionally computed. The algorithm could be trivially extended to multiple frames to get a smoothed trajectory by assuming straight line motion of objects. Another extension of the algorithm is the use of filtering techniques. The results are filtered using the current input, past inputs and outputs to produce the current output. Yet another extension is the use of Kalman filters. See R. E. Kalman, *A New Approach to Linear Filtering and Prediction Problems*, Transactions of the ASME (March 1960) which is incorporated herein by reference. The Kalman filter is a powerful technique for doing incremental, real-time estimation in dynamic systems. It allows for the integration of information over time and is robust with respect to both system and sensor noise.

The event generation logic depends on several factors: the door type, the presence of the optional outgoing area system, the algorithms in use, note that a single system itself might have multiple algorithms in use. This logic takes the outputs from various zones in the various systems and integrates them to provide events that can directly be used to control the door motion.

The actual inner workings of such a system as described herein simply outline a preferred approach as there is considerable amount of literature and state of the art for these topics. Therefore, one could easily use a custom algorithm for any of the pieces to build a SDS system.

Although various calibration methods are described herein in terms of illustrative embodiments of the invention, persons having ordinary skill in the art should appreciate that any number of calibration methods can be used without departing from the spirit and scope of the invention. See, for example, references 1-4. Although the illustrative embodiment described herein is setup in the factory using factory setup procedures, persons having ordinary skill in the art should appreciate that any of the described setup steps can also be performed in the field without departing from the scope of the invention.

Although an interior orientation process for determining the internal geometry of cameras in terms of the camera constant, the image center, radial distortion coefficients and aspect ratio, persons having ordinary skill in the art should appreciate that additional intrinsic parameters may be added or some of these parameters ignored in alternative embodiments within the scope of the present invention.

Although ground plane calibration in the illustrative embodiments described herein is performed at the location of installation, persons having ordinary skill in the art should appreciate that ground plane calibration could also be performed in the factory or at alternate locations without departing from the spirit and scope of the invention.

Although edge processing is performed in the illustrative embodiments described herein by performing parabolic smoothing, non-integral sub sampling (at specific granularity) sobel edge detection followed by true peak detection and chaining, persons having skill in the art should appreciate that any number of edge processing methods known in the art can be used in the edge processing step without departing from the spirit and scope of the present invention.

Although the matching step of an illustrative embodiment is described herein wherein matching features are characterized by a strength of match followed by implementing a smoothness constraint, persons having ordinary skill in the art should appreciate that various alternatives matching processes can be substituted, therefore, without departing from the spirit and scope of the present invention.

Although the illustrative embodiment of the present invention is described herein, including a merging step using a simple multiplexing scheme having specific orientation limits from which to distinguish horizontal disparities from vertical disparities, persons having ordinary skill in the art should appreciate that these limits are somewhat arbitrary and can be widened or narrowed without departing from the spirit and scope of the present invention.

Although illustrative embodiments of the present invention are described generally in terms of monitoring a passageway for triggering an event, persons having skill in the art should envision any number of alternative embodiments of the present invention in security, safety, motion control and various other applications. For example, a stereo vision system can be used according to the present invention to trigger an alarm when a person or object enters a particular area or moves in a particular direction within that area or passageway. An alternative illustrative embodiment of the invention for example, could trigger an alert signal or close a gate if an automobile is detected traveling in the wrong direction on a highway or exit ramp.

Although illustrative embodiments of the present invention are described in terms of filtering objects having predetermined heights above the ground plain, persons having ordinary skill in the art should appreciate that a stereo vision system according to the present invention could also filter objects at a predetermined distance from any arbitrary plain such as a wall, without departing from the spirit or scope of the invention.

Although the invention is described herein in terms of a two camera stereo vision system, persons skilled in the art should appreciate that a single camera can be used to take two or more images from different locations to provide stereo images within the scope of the invention. For example, a camera could take separate images from a plurality of locations. Alternatively, a plurality of optical components could be arranged to provide a plurality of consecutive views to a stationary camera for use as stereo images according to the invention. Such optical components include reflective optical components, for example, mirrors, and refractive optical components, for example, lenses.

Although the invention has been shown and described with respect to exemplary embodiments thereof, persons having ordinary skill in the art should appreciate that various other changes, omissions and additions in the form and detail thereof may be made therein without departing from the spirit and scope of the invention.

The invention claimed is:

1. A method of controlling an object's motion through a viewed space compromising:
    acquiring a stereo image of said viewed space wherein stereo image comprises an image set;
    computing a set of 3D features from said stereo image;
    filtering from said set of 3D features to generate a set of filtered 3D features;
    computing a trajectory of said set of filtered 3D features; and
    generating a control signal influencing said object's motion in response to said trajectory;
    wherein said step of computing a set of 3D features includes the steps of:
        edge-processing said stereo image to generate a plurality of connected edgelets;
        identifying connected edgelets having length greater than a predetermined threshold as features;
        matching features to generate disparities generated from different images in said image set; and
        computing 3D locations of feature points according to at least said disparities.

2. The method according to claim 1 wherein said step of computing a set of 3D features further comprises the steps of:
    merging horizontal and vertical disparities to form a set of selected disparities;
    wherein said step of computing 3D locations of feature points is performed according to said set of selected disparities and camera geometry.

3. The method according to claim 1 further compromising the step of:
    segmenting said 3D features to identify mutually exclusive subsets of boundary point as objects;
    wherein said set of filtered 3D features are generated by filtering ground plane noise form said objects.

4. The method according to claim 1 wherein said edge processing step detects features by performing:
    a parabolic smoothing step;
    a non-integral sub-sampling step at a predefined granularity;
    a sobel edge detection step;
    a true peak detection step; and
    a chaining step.

5. The method according to claim 1 wherein said matching step includes the steps of:
    matching features from a first image to a second image to identify disparities;
    constraining an initial set of possible matches of said disparities for each feature using an epipolar constraint;
    characterizing each of said possible matches by an initial strength of match (SOM), by comparing the strength and orientation of said edgelets; and
    enforcing a smoothness constraint within a preselected allowable disparity gradient.

6. The method according to claim 5 wherein said step of enforcing a smoothness constraint comprises the steps of:
    updating the SOM of each correspondence comparing correspondences neighboring features under consideration; and
    enforcing uniqueness by iteratively identifying matches having a maximum matching strength for both of its constituent features and eliminating all other matches associated with each constituent of the identified match.

7. The method according to claim 5 wherein said first and second image comprise a right and a left image:
    wherein features from said right and left images are merged to identify horizontal disparities; and
    further matching features from either said right or left image to a top image to identify vertical disparities.

8. The method according to claim 2 wherein said merging step includes the steps of multiplexing said disparities by:
    selecting said horizontal disparities to be passed along if an orientation of said feature is between 45 and 135 or between 225 and 315.

9. The method according to claim 3 wherein said step of segmenting includes the steps of:
    generating initial clusters according to chain organization of said edgelets;
    breaking chains of features into contiguous segments based on abrupt changes in z between successive points; and
    merging two closet clusters based on a minimum distance criteria.

10. The method according to claim 3 wherein said segmenting step includes the step of selecting only objects wherein a 2D distance between the objects along a particular plane exceed a preset spacing threshold.

11. The method according to claim 1 wherein said step of computing a set of 3D features includes steps of:
    rectifying right and left images to generate a right and left rectified image;

matching features from said right and left rectified image to produce a dense disparity image;

edge-processing either said right or said left rectified image to generate a plurality of connected edgelets;

identifying connected edgelets having length greater than a predetermined threshold as features;

mapping locations of said features into said dense disparity image to sparsified disparities computing 3D locations of feature points according to said sparsified disparities and camera geometry.

12. The method according to claim 1 wherein said step of filtering further comprises the steps of:

converting said 3D features to a ground plane coordinate system;

eliminating features having excessive or insufficient range, excessive lateral distance, excessive height, or insufficient distance from said ground plane;

projecting remaining features into said ground plane to generate projected features;

converting said projected features to a 2D image;

obtaining distinct regions wherein each pixel represents a plurality of feature points;

scoring features in said distinct region using a scoring function to generate region scores;

accumulating said region scores and comparing said accumulated scores to a predetermined threshold to determine if an object is present or absent.

13. The method according to claim 1 wherein said step of computing a trajectory further comprises the step of correlating segmented features in a first frame with features around an expected object position in a following frame.

14. A method of determining an object's trajectory comprising:

viewing an area with stereo cameras to generate a stereo image;

edge-processing said stereo image to generate a plurality of connected edgelets;

identifying connected edgelets having length greater than a predetermined threshold as features;

measuring a height of said features relative to a ground plane;

clustering said features having a height above said ground plane in 3D space to generate objects; and tracking said objects in multiple frames.

* * * * *